(12) United States Patent
Sen

(10) Patent No.: US 10,440,284 B2
(45) Date of Patent: *Oct. 8, 2019

(54) DETERMINATION OF EXPOSURE TIME FOR AN IMAGE FRAME

(71) Applicant: Microsoft Technology Licensing, LLC, Redmond, WA (US)

(72) Inventor: Sumeet Sen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,791

(22) Filed: Jan. 31, 2018

(65) Prior Publication Data

US 2018/0160023 A1 Jun. 7, 2018

Related U.S. Application Data

(63) Continuation of application No. 15/426,020, filed on Feb. 6, 2017, now Pat. No. 9,924,107, which is a
(Continued)

(51) Int. Cl.
| | |
|---|---|
| *H04N 5/235* | (2006.01) |
| *H04N 5/232* | (2006.01) |
| *G06T 7/215* | (2017.01) |
| *G06K 9/46* | (2006.01) |
| *G06T 7/20* | (2017.01) |

(52) U.S. Cl.
CPC ......... *H04N 5/2353* (2013.01); *G06K 9/4671* (2013.01); *G06T 7/20* (2013.01); *G06T 7/215* (2017.01); *H04N 5/23254* (2013.01)

(58) Field of Classification Search
CPC .... H04N 5/2353; H04N 5/23254; G06T 7/20; G06T 7/215; G06K 9/4671
See application file for complete search history.

(56) References Cited

U.S. PATENT DOCUMENTS

| | | |
|---|---|---|
| 7,346,222 B2 | 3/2008 | Lee et al. |
| 7,495,699 B2 | 2/2009 | Nayar et al. |

(Continued)

FOREIGN PATENT DOCUMENTS

| | | |
|---|---|---|
| EP | 2149108 A2 | 2/2010 |
| WO | 2006070046 A1 | 7/2006 |

OTHER PUBLICATIONS

"Digital Photography", Retrieved from <<http://www.gcflearnfree.org/digitalphotography/6>>, Nov. 11, 2011, 3 Pages.
(Continued)

*Primary Examiner* — Padma Haliyur

(57) ABSTRACT

An apparatus for adjusting an exposure time for an image frame is presented. The apparatus comprises at least one processing unit and at least one memory. The at least one memory stores program instructions that, when executed by the at least one processing unit, cause the apparatus to process at least one image frame, select at least one region of interest from the at least one image frame, process at least two consecutive image frames to determine a motion field, segment the motion field into at least one motion cluster, select based on the at least one region of interest and the at least one motion cluster, the most relevant motion cluster, and adjust the exposure time based on motion information of the selected most relevant motion cluster.

20 Claims, 8 Drawing Sheets

Related U.S. Application Data continuation of application No. 14/735,682, filed on Jun. 10, 2015, now Pat. No. 9,635,276.

(56) References Cited

U.S. PATENT DOCUMENTS

| | | |
|---|---|---|
| 7,546,026 B2 | 6/2009 | Pertsel et al. |
| 7,602,418 B2 | 10/2009 | Border et al. |
| 7,697,778 B2 | 4/2010 | Steinberg et al. |
| 7,750,943 B2 | 7/2010 | Nagano et al. |
| 8,045,024 B2 | 10/2011 | Kumar et al. |
| 8,179,466 B2 | 5/2012 | Border et al. |
| 8,224,056 B2 | 7/2012 | Pack et al. |
| 8,396,321 B1 | 3/2013 | Aldrich |
| 8,482,618 B2 | 7/2013 | Lin |
| 8,488,006 B2 | 7/2013 | Miyazaki |
| 8,498,486 B2 | 7/2013 | Forutanpour |
| 9,426,020 B2 | 8/2016 | Vasseur et al. |
| 2002/0180876 A1 | 12/2002 | Sobol |
| 2004/0001147 A1 | 1/2004 | Vella et al. |
| 2007/0071424 A1 | 3/2007 | Poon et al. |
| 2007/0121094 A1 | 5/2007 | Gallagher et al. |
| 2009/0102935 A1 | 4/2009 | Hung et al. |
| 2009/0231449 A1 | 9/2009 | Tzur et al. |
| 2012/0201426 A1 | 8/2012 | Jasinski et al. |
| 2013/0272504 A1 | 10/2013 | Deutsch |
| 2014/0037212 A1 | 2/2014 | Endo |

OTHER PUBLICATIONS

"Non Final Office Action Issued in U.S. Appl. No. 14/735,682", dated Jun. 2, 2016, 14 Pages.

"Notice of Allowance Issued in U.S. Appl. No. 14/735,682", dated Dec. 9, 2016, 8 Pages.

"Non Final Office Action Issued in U.S. Appl. No. 15/426,020", dated May 4, 2017, 11 Pages.

"Notice of Allowance Issued in U.S. Appl. No. 15/426,020", dated Nov. 7, 2017, 7 Pages.

Hou, et al., "Saliency Detection: A Spectral Residual Approach", Retrieved from <<https://web.archive.org/web/20120417145046/http://www.klab.caltech.edu/~xhou/papers/cvpr07.pdf>>, Retrieved on: Apr. 17, 2012, 8 Pages.

Levin, et al., "Motion-Invariant Photography", In Proceedings of the 35th International Conference and Exhibition on Computer and Interactive Techniques, Aug. 11, 2008, 9 Pages.

"International Search Report and Written Opinion Issued in PCT Application No. PCT/US2016/035948", dated Jul. 27, 2016, 12 Pages.

Perazzi, et al., "Saliency Filters: Contrast Based Filtering for Salient Region Detection", Retrieved from <<https://graphics.ethz.ch/~perazzif/saliency_filters/>>, Retrieved on: Jun. 9, 2015, 2 Pages.

Shen, et al., "Detecting and Removing the Motion Bluning from Video Clips", In Journal of Modern Education and Computer Science, Nov. 2010, pp. 17-23.

| 100 | 100 | 100 | 50 | 50 | 10 | ~700
|-----|-----|-----|----|----|----|
| 100 | 100 | 100 | 50 | 50 | 10 |
| 100 | 100 | 100 | 50 | 50 | 10 |
| 100 | 100 | 20  | 20 | 20 | 0  |
| 0   | 0   | 20  | 20 | 20 | 0  |
| 0   | 0   | 40  | 40 | 40 | 0  |
| 0   | 0   | 40  | 40 | 40 | 0  |

FIG. 7A

| 0.1 | 0.1 | 0.1 | 0.1 | 0.1 | 0.1 | ~702
|-----|-----|-----|-----|-----|-----|
| 0.1 | 0.1 | 0.1 | 0.1 | 0.1 | 0.1 |
| 0.1 | 0.1 | 0.1 | 0.1 | 0.1 | 0.1 |
| 0.1 | 0.1 | 0.8 | 0.8 | 0.8 | 0.5 |
| 0.5 | 0.5 | 0.8 | 0.8 | 0.8 | 0.5 |
| 0.5 | 0.5 | 0.3 | 0.3 | 0.3 | 0.5 |
| 0.5 | 0.5 | 0.3 | 0.3 | 0.3 | 0.5 |

FIG. 7B

| 10 | 10 | 10 | 5  | 5  | 0.1 | ~704
|----|----|----|----|----|-----|
| 10 | 10 | 10 | 5  | 5  | 0.1 |
| 10 | 10 | 10 | 5  | 5  | 0.1 |
| 10 | 10 | 16 | 16 | 16 | 0   |
| 0  | 0  | 16 | 16 | 16 | 0   |
| 0  | 0  | 12 | 12 | 12 | 0   |
| 0  | 0  | 12 | 12 | 12 | 0   |

DETERMINATION OF EXPOSURE TIME FOR AN IMAGE FRAME

CROSS REFERENCE TO RELATED APPLICATIONS

This application is a continuation of and claims priority to U.S. application Ser. No. 15/426,020, entitled "DETERMINATION OF EXPOSURE TIME FOR AN IMAGE FRAME," filed Feb. 6, 2017, which is a continuation of and claims priority to U.S. application Ser. No. 14/735,682, entitled "DETERMINATION OF EXPOSURE TIME FOR AN IMAGE FRAME," filed Jun. 10, 2015, which are incorporated herein in their entireties.

BACKGROUND

When taking an image with a camera, the presence of a moving object or moving camera during the image exposure may cause motion blur in the image. In order to avoid motion blur, the exposure time may be adjusted automatically or manually.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processing unit, and at least one memory. The at least one memory stores program instructions that, when executed by the at least one processing unit, cause the apparatus to process at least one image frame, select at least one region of interest from the at least one image frame, process at least two consecutive image frames to determine a motion field, segment the motion field into at least one motion cluster, select, based on the at least one region of interest and the at least one motion cluster, the most relevant motion cluster, and adjust the exposure time based on motion information of the selected most relevant motion cluster.

In another embodiment, a method is provided. The method comprises processing at least one image frame, selecting at least one region of interest from the at least one image frame, processing at least two consecutive image frames to determine a motion field, segmenting the motion field into at least one motion cluster, selecting, based on the at least one region of interest and the at least one motion cluster, the most relevant motion cluster, and adjusting the exposure time based on motion information of the selected most relevant motion cluster.

In another embodiment, an apparatus is provided. The apparatus comprises at least one processing unit, and at least one memory. The at least one memory stores program instructions that, when executed by the at least one processing unit, cause the apparatus to process at least two consecutive image frames to determine a motion field, segment the motion field into different motion clusters based on motion values of the motion field, rank the motion clusters based on relevance of the motion, select the most relevant motion cluster based on the ranking, and adjust the exposure time based on motion information of the most relevant motion cluster.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 7A illustrates another embodiment for determining an exposure time for an image frame.

FIG. 7B illustrates another embodiment for determining an exposure time for an image frame.

FIG. 7C illustrates another embodiment for determining an exposure time for an image frame.

FIG. 7D illustrates another embodiment for determining an exposure time for an image frame.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Figure 1:
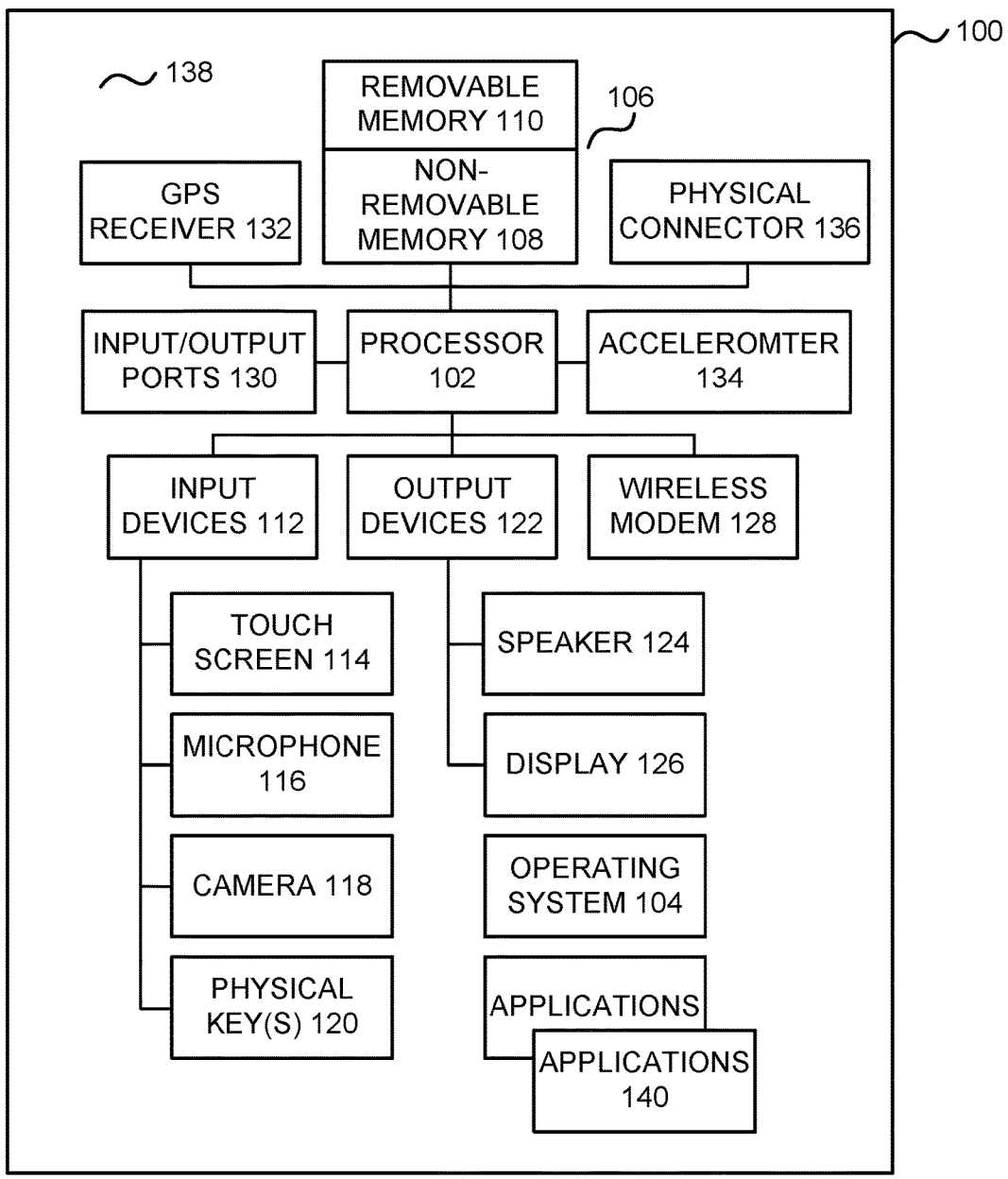
FIG. 1 is a system diagram depicting an apparatus including a variety of optional hardware and software components.

FIG. 1 is a system diagram depicting an apparatus 100 including a variety of optional hardware and software components, shown generally at 138. Any components 138 in the apparatus 100 can communicate with any other component, although not all connections are shown, for ease of illustration. The apparatus 100 can be any of a variety of computing devices that include a camera (for example, a digital camera, a cell phone, a smartphone, a handheld computer, a tablet computer, a Personal Digital Assistant (PDA), etc.).

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components 138 and support one or more application programs 140. The application programs can include common mobile computing applications (e.g., email applications, calendars, contact managers, web browsers, messaging applications), or any other computing application.

The illustrated apparatus 100 can include a memory 106. The memory 106 can include a non-removable memory 108 and/or removable memory 110. The non-removable memory 108 can include a RAM, ROM, flash memory, a hard disk, or other well-known memory storage technologies. The removable memory 110 can include flash memory or a Subscriber Identity Module (SIM) card, which is well known in GSM communication systems, or other well-known memory storage technologies, such as "smart cards". The memory 106 can be used for storing data and/or code for running the operating system 104 and the applications 140. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120, and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 140 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input for a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 100 can further include at least one input/output port 130, a satellite navigation system receiver 132, such as a Global Positioning System (GPS) receiver, one or more hardware motion sensors (for example, an accelerometer, a gyroscope etc.) 134, and/or a physical connector 136, which can be a USB port, IEEE 1394 (FireWire) port, and/or RS-232 port. The illustrated components 138 are not required or all-inclusive, as any components can be deleted and other components can be added.

The processor 102, or the processor 102 and the memory 106 may act as means for processing at least one image frame, means for selecting at least one region of interest from the at least one image frame, means for processing at least two consecutive image frames to determine a motion field, means for segmenting the motion field into at least one motion cluster, means for selecting, based on the at least one region of interest and the at least one motion cluster, the most relevant motion cluster, and means for adjusting the exposure time based motion on information of the selected most relevant motion cluster.

The processor 102, or the processor 102 and the memory 106 may act as means for processing at least two consecutive image frames to determine a motion field, means for segmenting the motion field into different motion clusters based on motion values of the motion field, means for ranking the motion clusters based on relevance of the motion, means for selecting the most relevant motion cluster based on the ranking, and means for adjusting the exposure time based on motion information of the most relevant motion cluster.

Figure 2A:
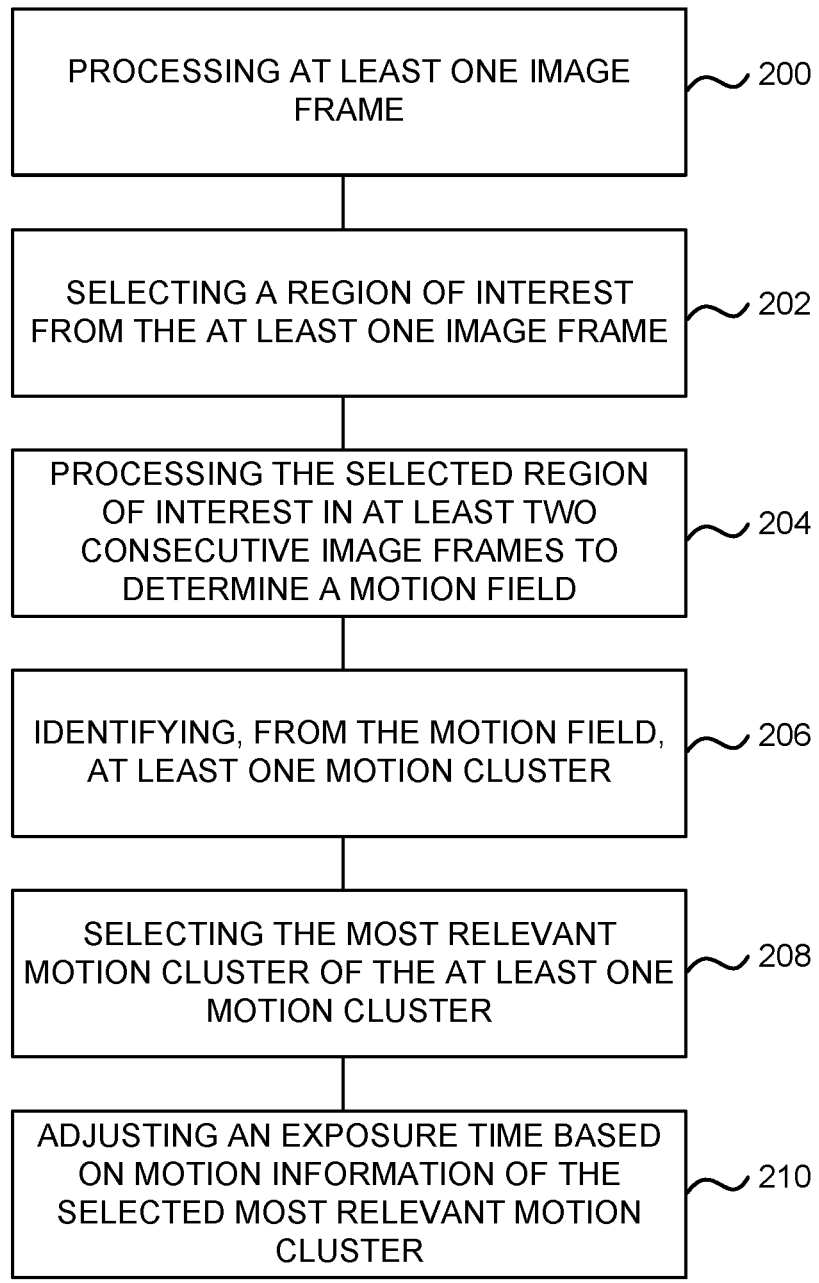
FIG. 2A is a flowchart illustrating one embodiment of a method for determining exposure time for an image frame.

FIG. 2A is a flowchart illustrating one embodiment of a method for determining an exposure time for an image frame, when a digital image is to be captured. When a user operates a digital camera or an apparatus comprising a digital camera, the user may use automatic exposure settings, and the digital camera decides various shooting parameters (for example, the exposure time, the aperture and the ISO value). Another possibility is to manually set at least one of these shooting parameters. In the following a method for determining the exposure time for an image frame is provided.

At 200 at least one image frame is processed. When a user intends to take digital images, image frames may be automatically recorded to an image frame buffer even if the user does not yet press the shutter-release button. The apparatus is then able to perform some analysis based on an image frame or multiple image frames stored in the image frame buffer.

At 202 a region of interest is selected from the at least one image frame. In another embodiment, the region of interest is selected from at least two consecutive image frames. The image frame may refer to a normal full size image frame comprising all captured image pixels or to a smaller size image frame including a subset of all captured image pixels shown, for example, in a view-finder of a camera. The region of interest may be any part of the image frames and it may be determined automatically by the digital camera or manually by the user. The region of interest may comprise the whole area of the image frames and not just a sub-region of the image frames. The region of interest may be selected because it is the closest region to the center of the image frames. It is also possible to rank regions in the image data frames, and to select the region having the highest rank as the region of interest. Ranking may be based on at least one of the following parameters: the size of the region, the location of the region, and the frequency of occurrence in the image frames of the region. It may also be possible to predefine at least one region of interest and to assign weights for the predefined regions. The user may also predefine at least one region of interest by just interacting with the screen of the apparatus. The user may touch different regions of the screen and indicate their weights. The user may also draw on the screen freely to indicate the region of interest and then assign a weight for it.

At 204 the selected region of interest in at least two consecutive image frames is processed to determine a motion field. The motion field defines the motion in the selected region of interest. Each point in the motion field may be represented as a two-dimensional vector that represents the relative displacement of that point in the three-dimensional world.

At 206 at least one motion cluster is identified from the motion field. A motion cluster may refer to a sub-region in the selected region of interest where motion field values are identical or substantially identical or similar. As an example, a moving single object may form a motion cluster. A single object may also form multiple motion clusters. For example, if the moving object is a walking person, the limbs might move in different directions and hence the limbs can be classified as different motion clusters. A single motion cluster may also fill the selected region of interest completely. In one example, the whole region of interest may be classified as a single motion cluster. It is possible that there is no motion in the single motion cluster, for example, when the single motion cluster includes a static object. In this case, the motion field indicates zero motion for this motion cluster.

At 208 the most relevant motion cluster of the at least one motion cluster is selected. The most relevant motion cluster may be determined, for example, based on the size of the motion clusters, the location of the motion clusters, the frequency of occurrence of the motion clusters in the image frames, the direction of movement in the motion clusters, and the motion propagation across the at least two consecutive image frames. The selected most relevant motion cluster may also be a motion cluster that has zero motion.

At 210 the exposure time is adjusted based on motion information of the selected most relevant motion cluster. The selected most relevant motion cluster may be a motion cluster having zero motion, and the exposure time may be calculated based on this motion cluster. The most relevant motion cluster may comprise a moving object, and the exposure time may be calculated based on the moving object. If the most relevant motion cluster indicates that the object is static, the exposure time may be longer than the default exposure time calculated by the Automatic Exposure Control (AEC). Since multiple image frames are processed, it is possible to calculate the speed of movement in the most relevant motion cluster, and to determine the required exposure time based on this.

By taking into account the motion of the most relevant motion cluster in determining the exposure time, it is possible to set the exposure time to a level that avoids motion blur in the most relevant part of an image frame. Underexposing a scene to compensate for a motion of an object that is not important to the user will lead to poor image quality.

The disclosed solution enables the understanding of the importance of the moving object before reducing the exposure time. Further, the solution also enables the user to have an influence on the exposure time determination when the user is allowed to select the region of interest.

In another embodiment, only one image frame is processed at 200, and the region of interest is selected at 202 based on this one image frame. For example, saliency may be determined based on only one image frame. Then, before the selected region of interest is processed to determine a motion field at 204, at least one further image frame may be obtained and processed in order to be able to determine the motion field. Further, if the region of interest is selected based on a predefined region of interest, it is possible to select the region of interest without any image frames.

Figure 2B:
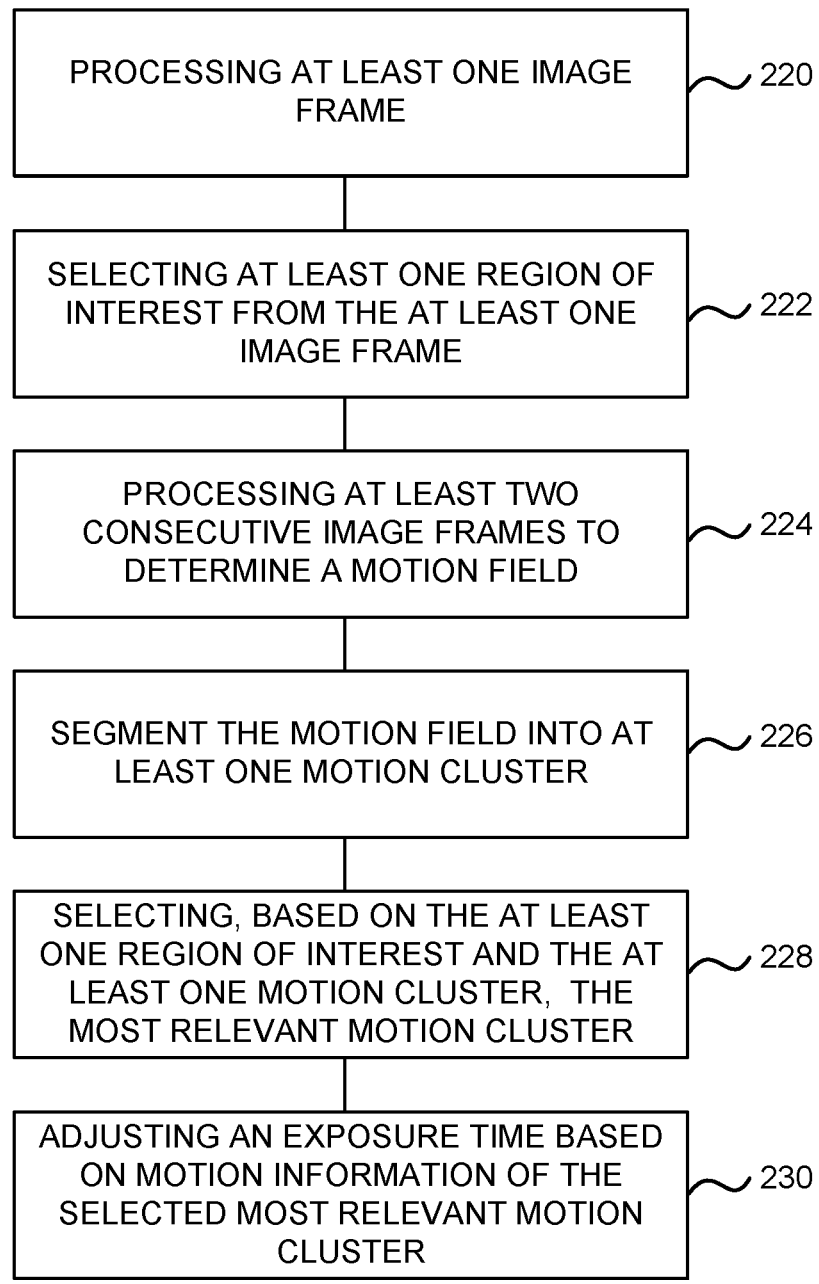
FIG. 2B is a flowchart illustrating another embodiment of a method for determining an exposure time for an image frame.

FIG. 2B is a flowchart illustrating another embodiment of a method for determining an exposure time for an image frame, when a digital image is to be captured. When a user operates a digital camera or an apparatus comprising a digital camera, the user may use automatic exposure settings, and the digital camera decides various shooting parameters (for example, the exposure time, the aperture and the ISO value). Another possibility is to manually set at least one of these shooting parameters. In the following, a method for determining the exposure time for an image frame is provided.

At 220 at least one image frame is processed. When a user intends to take digital images, images frames may be automatically recorded in an image frame buffer even if the user does not yet press the shutter-release button. The apparatus is then able to perform some analysis based on an image frame or multiple image frames stored in the image frame buffer.

At 222 at least one region of interest is selected from the at least one image frame. The image frame may refer to a normal full size image frame comprising all captured image pixels or to a smaller size image frame including a subset of all captured image pixels shown, for example, in a viewfinder of a camera. The at least one region of interest may be any part of the image frames and it may be determined automatically by the digital camera or manually by the user. The at least one region of interest may comprise the whole area of the image frames, or a sub-region or sub-regions of the image frames. It may also be possible to predefine at least one region of interest and to assign weights for the predefined regions. The user may also predefine at least one region of interest by just interacting with the screen of the apparatus. The user may touch different regions of the screen and indicate their weights. The user may also draw on the screen freely to indicate the region of interest and then assign a weight for it.

At 204 at least two consecutive image frames are processed to determine a motion field. The motion field defines the motion in the at least two image frames. Each point in the motion field may be represented as a two-dimensional vector that represents the relative displacement of that point in the three-dimensional world.

At 226 the motion field is segmented into at least one motion cluster. A motion cluster may refer to a region where motion field values are identical or substantially identical. As an example, a moving single object may form a motion cluster. A single object may also form multiple motion clusters. For example, if the moving object is a walking person, the limbs might move in different directions and hence the limbs can be classified as different motion clusters. A single motion cluster may also fill the selected region of interest completely. In one example, the whole region of interest may be classified as a single motion cluster. It is possible that there is no motion in the single motion cluster, for example, when the single motion cluster includes a static object. In this case, the motion field indicates zero motion for this motion cluster.

At 228 the most relevant motion cluster is selected based on the at least one region of interest and the at least one motion cluster. The most relevant motion cluster may be determined, for example, based on weights of the at least one region of interest and weights of the at least one motion cluster. The weight of a region of interest may be based on at least one of the following: the size of the region of interest, and the location of the region of interest. The weight of the region of interest may also depend on the probability that the user, while composing the scene, will put the subject of interest in that region of interest. The weight of a motion cluster may be based on at least one of the following: the magnitude of motion in the motion cluster, the size of the motion cluster, the location of the motion cluster, the frequency of occurrence in the image frames of the motion cluster, the direction of motion in the motion cluster, and the motion propagation across the at least two consecutive image frames.

At 230 the exposure time is adjusted based on motion information of the selected most relevant motion cluster. The selected most relevant motion cluster may be a motion cluster having zero motion, and the exposure time may be calculated based on this motion cluster. The most relevant motion cluster may comprise motion, and the exposure time may be calculated based on the motion. If the most relevant motion cluster indicates that the object is static, the exposure time may be longer than the default exposure time calculated by the Automatic Exposure Control (AEC). Since multiple image frames are processed, it is possible to calculate the speed of movement in the most relevant motion cluster, and to determine the required exposure time based on this. It is also possible to have a static object in the center of the scene and one or more motion clusters, for example, in the background. It is possible to consider the static object important even though there is no motion and to omit the motion of the motion clusters in the background, and to adjust the exposure time based on the static object.

By taking into account the motion of the most relevant motion cluster in determining the exposure time, it is possible to set the exposure time to a level that avoids motion blur in the most relevant part of an image frame. Underexposing a scene to compensate for a motion of an object that is not important to the user will lead to poor image quality. The disclosed solution enables the understanding of the importance of the moving object before reducing the exposure time. Further, the solution also enables the user to have an influence on the exposure time determination when the user is allowed to select the region of interest.

Figure 3:
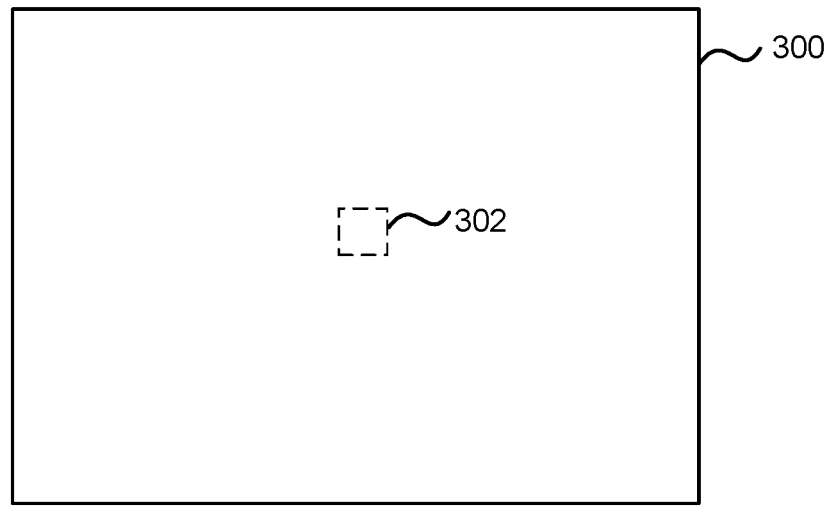
FIG. 3 illustrates another embodiment for determining an exposure time for an image frame.

FIG. 3 illustrates an embodiment for determining an exposure time for an image frame from an image frame or frames 300. The saliency of objects appearing in the image frames may be used in selecting a region of interest. The saliency of an object in general refers, for example, to the state or quality by which it stands out relative to its neighbor. Color, contrast etc. may be used to determine that an object is a salient object. Further, the face of a person may also represent a salient object. The rectangle 302 in FIG. 3 represents the salient object, and the salient object may be a moving object or a static object. A region of interest comprising the salient object may not be exactly identical with image pixels corresponding to the salient object, and a rougher area, for example, a polygon comprising the salient object may be used as the region of interest. The region of interest may also be selected based on only one image frame. It may also be possible to predefine a set of regions of interest and to assign different weights for the predefined regions. For example, a region in the center of the image frame may be considered important.

Once the region of interest has been determined, the selected region of interest is processed to determine a motion field. If only one image frame was obtained and processed earlier, at least one further image frame is obtained and processed to determine the motion field. The motion field defines the motion in the selected region of interest. The motion field may be represented as a function which maps image coordinates to a two-dimensional vector. Based on the motion field, it is possible to identify at least one motion cluster in the region of interest. A motion cluster refers to a sub-region in the selected region of interest where motion field values are identical or substantially identical or similar.

The region of interest may comprise a single object. If the object is static, the motion field does not indicate any movement. The exposure time for the next image frame may then be adjusted based on the static object.

The region of interest may cover a larger area than just the object determined to be salient. The region of interest may also comprise the whole area of the image frames and not just a sub-region of the image frames. When the at least one motion cluster is identified, it may be that the region of interest includes two or more motion clusters, and the motion of the salient object may differ from the motion in other motion clusters. However, it may be that inside the region of interest there is a motion cluster that constitutes a major portion of the region of interest, the major portion corresponding to the salient object. The exposure time for the next image frame may then be adjusted based on this motion cluster.

Let's assume that FIG. 3 represents a portrait being taken in a crowded touristic place with a lot of background motion. While taking a picture with a camera, there is a chance that the camera might pick a motion cluster with the highest motion value even though it is occurring somewhere in the background. This may lead to an underexposed foreground object or the whole scene being underexposed to compensate for something that is not very important to the user. Now it is possible to determine that a static salient object automatically or by a feedback from the user using touch, or the user might place the portrait on a predefined region of interest. It is then possible to use a longer exposure time instead of shortening it due to the motion in the background.

Figure 4:
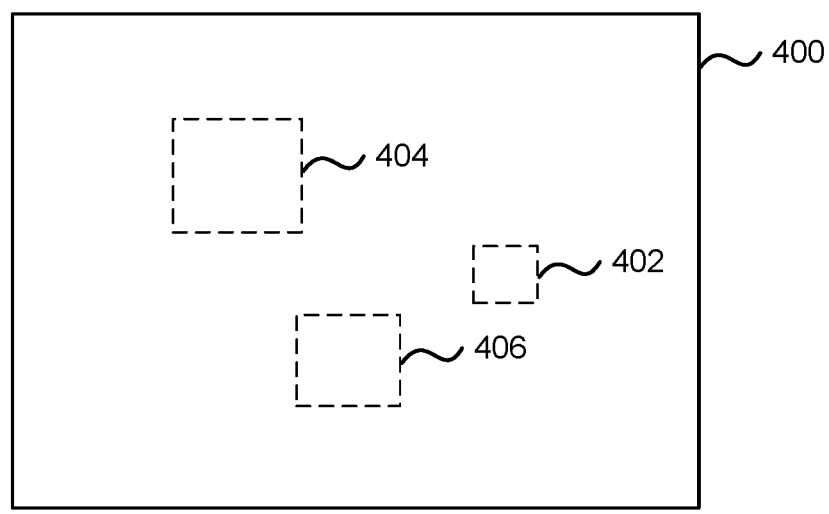
FIG. 4 illustrates another embodiment for determining an exposure time for an image frame.

FIG. 4 illustrates another embodiment for determining an exposure time for an image frame from an image frame or frames 400. The saliency of objects appearing in the image frames may be used in selecting a region of interest. The saliency of an object in general refers, for example, to the state or quality by which it stands out relative to its neighbor. Color, contrast etc. may be used to determine that an object is a salient object. The region of interest may also be selected based on only one image frame.

In the example of FIG. 4, there are three separate regions 402, 404, 406 in the image frames 400 that comprise salient objects. In this example, the region 406 is selected to be a region of interest, since it is closest to the center of the image frames 400. Alternatively, it is possible to rank the three regions 402, 404, 406, and to select the region having the highest weight as the region of interest. The weighting may be based on at least one of the following parameters: size of the region, location of the region, and frequency of occurrence in the image frames of the region. The weight of the region of interest may also depend on the probability that the user, while composing the scene, will put the subject of interest in that region of interest.

Saliency may be determined from the image frames using any known method for identifying salient regions. For example, by analyzing the log-spectrum of an input image, it is possible to extract the spectral residual of an image in spectral domain and to construct the corresponding saliency map in spatial domain. Saliency may be estimated also based on contrast. In this method, a given image is decomposed into compact, perceptually homogeneous elements that abstract unnecessary detail. Based on this abstraction two measures of contrast are computed that rate the uniqueness and the spatial distribution of these elements. From the element contrast it is possible to derive a saliency measure that produces a pixel-accurate saliency map which uniformly covers the objects of interest and consistently separates fore and background. The complete contrast and saliency estimation can be formulated in a unified way using high-dimensional Gaussian filters.

Once the region of interest 406 has been determined, at least one motion cluster is identified from a motion field of the region of interest 406. If only one image frame was obtained and processed earlier, at least one further image frame is obtained and processed to determine the motion field. The region of interest may comprise a single object. If the object is static, the identified motion cluster may not indicate any movement. The exposure time for the next image frame may then be adjusted based on the identified motion cluster.

In another embodiment, the region of interest 406 may cover a larger area than just the object determined to be salient. When the at least one motion cluster is identified, it may be that the region of interest 406 includes two or more motion clusters, and the motion of the salient object may differ from the motion in other motion clusters. However, it may be that inside the region of interest there is a motion cluster that constitutes a major portion of the region of interest, the major portion corresponding to the salient object. The exposure time may then be adjusted based on this motion cluster.

Figure 5:
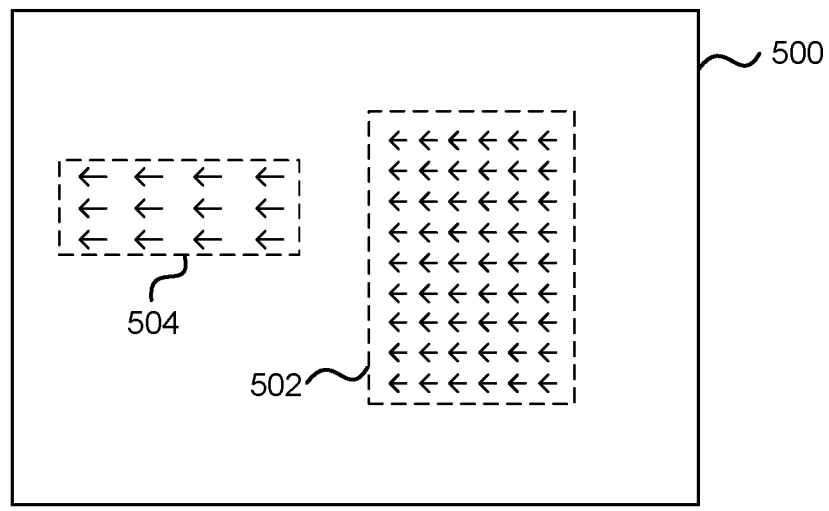
FIG. 5 illustrates another embodiment for determining an exposure time for an image frame.

FIG. 5 illustrates another embodiment for determining exposure time for an image frame from at least two consecutive image frames 500. The image frames 500 are processed to find a motion field. The motion field provides an indication of how elements in the image frames move during two or more subsequent image frames. The motion field is then segmented into motion clusters based on motion values of the motion field. In FIG. 5, two motion clusters 502, 504 can be found. The motion cluster represents a moving object moving towards the center of the image frame 500. The motion cluster 504 represents a moving object moving in an outward direction. The motion clusters 502, 504 may then be ranked based on the relevance of their motion. With regard to the motion cluster 504, the object is moving outwards from the image frame 500. With regard to the motion cluster 502, the motion cluster 502 is moving towards the center of the image frame 500 and it is relatively close to the center section of the image frame 500. In this embodiment, due to the closeness to the center and the movement of direction of the motion cluster 504, the motion cluster 502 has a higher weight than the motion cluster 504. The exposure time may then be adjusted based on this motion cluster. In another embodiment, the weighting may be performed differently, and it may be based on at least one of the following parameters: the size of the motion cluster, the location of the motion cluster, the frequency of occurrence in the image frames of the motion cluster, the direction of motion in the motion cluster, and the motion propagation across the at least two consecutive image frames. It may also be possible to predefine a set of regions of interest and to assign different weights for the predefined regions. When the motion clusters have been identified, the most relevant motion cluster may be selected based on the weights of the predefined regions and the weights of the motion clusters.

Figure 6:
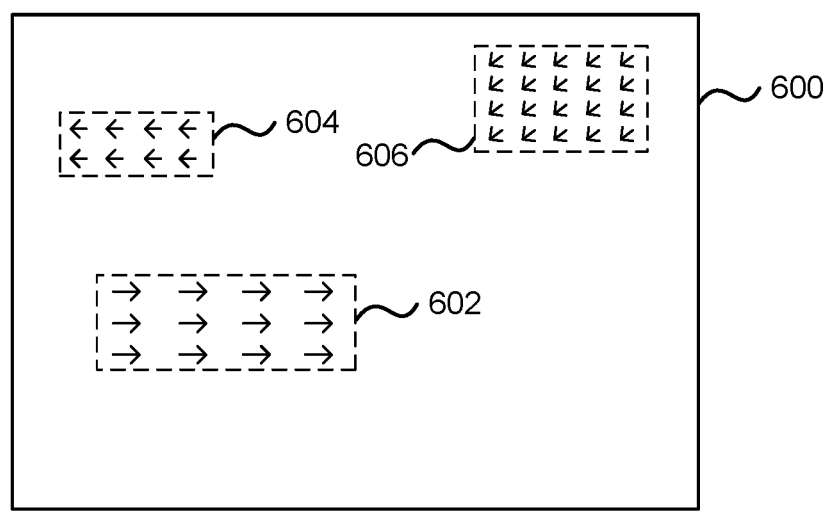
FIG. 6 illustrates another embodiment for determining an exposure time for an image frame.

FIG. 6 illustrates another embodiment for determining an exposure time for an image frame from at least two consecutive image frames 600. The image frames 600 are processed to find a motion field. The motion field provides an indication of how elements in the image frames move during two or more subsequent image frames. The motion field is then segmented to different motion clusters based on motion values of the motion field. In the example of FIG. 6, three motion clusters 602, 604, 606 can be found. The motion cluster 602 represents a moving object moving towards the center of the image frame 600. The motion cluster 604 represents a moving object moving in an outward direction. The motion cluster 606 represents a moving object moving towards the center of the image frame 600 and is located in the background in the image frame 600.

The motion clusters 602, 604, 606 are then weighted based on the relevance of their motion. The motion propagating through the center of the image frame 600 may be given a higher weight than the motion not propagating through the center of the image frame 600. Further, the motion appearing in the background may have a lower weight than the motion appearing in the foreground.

With regard to the motion cluster 604, the object is moving outwards from the image frame 600. With regard to the motion cluster 606, the motion cluster 606 is moving towards the center of the image frame 600. With regard to the motion cluster 602, the object is moving towards the center of the image frame 600. Due to the closeness to the center, the direction of the motion and the magnitude of the motion, the motion cluster 602 is determined to have the highest weight. The exposure time may then be adjusted based on this motion cluster.

In FIG. 6 there are multiple motion clusters and in the beginning, it is not known which one is the most important or relevant to the scene. However, since the exposure time is unique, it is not possible to compensate for all the motion in the scene, and one of the motions needs to be picked. The technique described in FIG. 6 makes it possible to make the best guess about which motion value to use while calculating the exposure time.

FIGS. 7A-7D illustrate another embodiment for determining an exposure time for an image frame from at least two consecutive image frames.

The view 700 represents a motion field map determined based on the at least two consecutive image frames. Values appearing in the motion field may represent the magnitude of motion in the image frames. In this example, the highest motion field values can be found in the upper left corner. Although FIG. 7A represents the motion field using only magnitude values, the motion field may be clustered into motion clusters and values relating to the motion clusters may reflect the overall relevancy of the motion clusters. One or more of the following parameters may be used to determine the relevancy: the magnitude of motion in the motion cluster, the size of the motion cluster, the location of the motion cluster, the frequency of occurrence in the image frames of the motion cluster, the direction of motion in the motion cluster, and the motion propagation across the at least two consecutive image frames. The weights of the motion clusters may also be normalized so that the maximum value is 1.

The view 702 illustrates a saliency value map for the image frames. Saliency in general refers, for example, to the state or quality of how an image pixel stands out relative to its neighbor. Color, contrast etc. may be used to determine whether something appearing in the image frames is salient or not. In the saliency map, there is a saliency score for each image pixel. The view 702 represents the saliency map as a normalized saliency map so that all saliency values are between 0 and 1, 1 being the maximum saliency value.

The saliency may be determined from the image frames using any known method for identifying salient regions. For example, by analyzing the log-spectrum of an input image, it is possible to extract the spectral residual of an image in spectral domain and to construct the corresponding saliency map in spatial domain. Saliency may be estimated also based on contrast. In this method, a given image is decomposed into compact, perceptually homogeneous elements that abstract unnecessary detail. Based on this abstraction two measures of contrast are computed that rate the uniqueness and the spatial distribution of these elements. From the element contrast it is possible to derive a saliency measure that produces a pixel-accurate saliency map which uniformly covers the objects of interest and consistently separates fore and background. The complete contrast and saliency estimation can be formulated in a unified way using high-dimensional Gaussian filters.

The motion values are multiplied pixel by pixel with the normalized saliency values. The view 704 illustrates that the saliency values of the view 702 have been used as weights for the motion values of the view 700. For example, in the upper left corner the motion of magnitude 100 becomes non-important (having the value 10 in the weighted motion values) with the saliency value of 0.1 In the middle of the image frames there is a motion of magnitude 20 and the saliency values for this motion are 0.8, thus indicating high saliency.

The view 706 illustrates the result when the weighted motion field map has been segmented based on the weighted motion values into motion clusters 706-718. The motion clusters 706-718 may be ranked to determine the most relevant motion cluster. The ranking may be based on the weighted motion values only. Based on the weighted motion values, the motion cluster 714 has the highest rank.

When the most relevant motion cluster has been selected, the exposure time can be adjusted based on the motion values of the most relevant motion cluster.

Figure 8A:
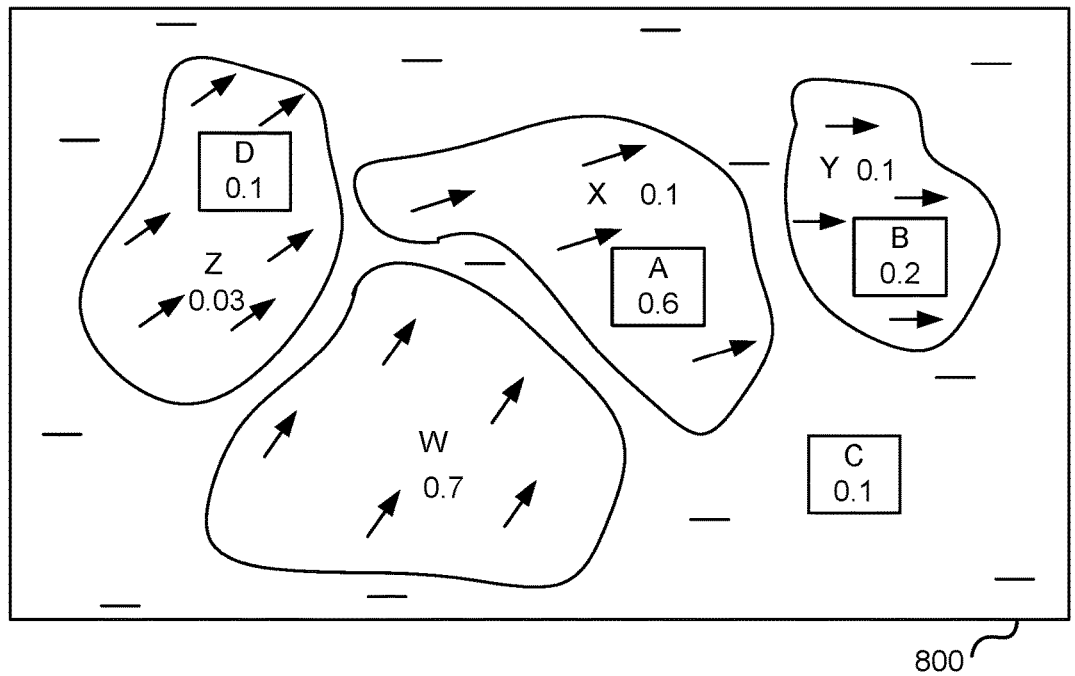
FIG. 8A illustrates another embodiment for determining an exposure time for an image frame.

FIG. 8A illustrates another embodiment for determining an exposure time for an image frame.

At least one image frame 800 is processed and multiple regions of interest are identified from the image frame 800. The rectangles A, B, C and D represent regions of interest identified from the image frame 800. In this embodiment, a face recognition procedure may be used to identify a face or faces from the image frame 800, and the regions of interest A, B, C and D may represent the identified faces. A weight may be calculated for each region of interest. The weight of A is 0.6, the weight of B is 0.2, the weight of C is 0.1 and the weight of D is 0.1. The weights may be normalized so that the total sum of the weights of all regions of interest is 1. The weighting may be based, for example, on how close each region of interest is to the center of the image frame. Here A is closest to the center of the image frame and thus has the highest weight. The weighting may also take into account the size of the region of interest.

At least two consecutive image frames are then processed to determine a motion field. The motion field defines the motion in the image frame. Each point in the motion field may be represented as a two-dimensional vector that represents the relative displacement of that point in the three-dimensional world. The motion field is segmented into at least one motion cluster. Each motion cluster comprises a segment of the motion field where the motion is identified to be similar, for example, the magnitude and direction of the motion are similar or identical. Any known method may be used to perform the motion clustering. The motion clusters X, Y, Z and W are identified from the motion field. A weight may be calculated for each motion cluster. In this embodiment, the weight of X is 0.1, the weight of Y is 0.1, the weight of Z is 0.03 and the weight of W is 0.7. The weights may be normalized so that the total sum of the weights of all motion clusters is 1. The weighting may be based on various factors, for example, at least one of the following: the magnitude of the motion in the motion cluster, the size of the motion cluster, the location of motion cluster, the frequency of occurrence in the image frames of the motion cluster, the direction of motion in the motion cluster, and the motion propagation across the at least two consecutive image frames. The motion in the motion cluster W is directed to the center of the image frame 800 and the size of the motion cluster is significant. It is also located close to the center of the image frame 800. Based on these factors it can be determined that the motion cluster W needs to be assigned the highest weight.

The most relevant motion cluster is selected based on the at least one region of interest and the at least one motion cluster, as a basis for adjusting exposure time. In this embodiment, the weights of the regions of interest and the motion clusters are multiplied to form total weights. Here the total weight for the motion cluster W is 0.7, for the motion cluster X it is 0.06, for the motion cluster Y it is 0.02 and for the motion cluster Z it is 0.003. Based on the total weights, the motion cluster W is considered to be the most relevant motion cluster, and the exposure time is adjusted based on motion information, for example, the magnitude of motion in this motion cluster. In another embodiment, instead of multiplying the weights of the motion clusters with the weights of overlapping the regions of interest, any other operation that modifies the weights of the motion clusters depending on the weights of overlapping regions of interest may be used.

In another embodiment of FIG. 8A, only the motion clusters overlapping the regions of interest are considered when adjusting the exposure time. In this case, only the motion clusters X, Y and Z will be considered since they overlap the regions of interest A, B and C. Based on the total weights already discussed above, the motion cluster X overlapping the region of interest A is selected as the most relevant motion cluster, and the exposure time is adjusted based on motion information of this motion cluster.

Figure 8B:
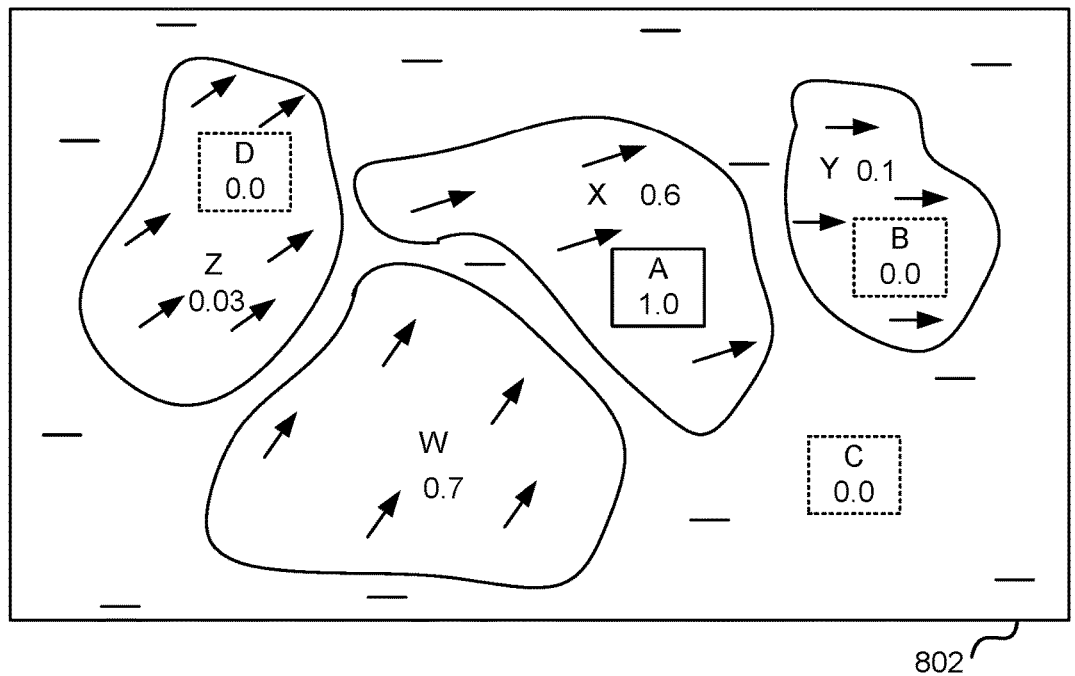
FIG. 8B illustrates another embodiment for determining an exposure time for an image frame.

FIG. 8B illustrates another embodiment for determining an exposure time for an image frame 802. The embodiment of FIG. 8B differs from the embodiment of FIG. 8A in that the region of interest A is assigned an absolute priority and the weight for it is 1.0. The remaining regions of interest B, C and D are not taken into consideration and their weights are 0.0. Only if a motion cluster is overlapping (the motion cluster X in FIG. 8B), a region of interest (the region of interest A in FIG. 8B) will be given the maximum weight. The region of interest A may be assigned the maximum priority, for example, if a user selects a certain point or region from a viewfinder image using a touch screen of an apparatus comprising a camera.

In FIG. 8B the total weight for the motion cluster W is 0.7 and the total weight for the motion cluster A is 0.6 (1.0×0.6). This means that, even if the user selected the region of interest A to have the maximum weight, the exposure time is adjusted based on motion information, for example, the magnitude of the motion of the motion cluster W.

In another embodiment of FIG. 8B, only the motion clusters overlapping the selected region of interest are considered when selecting the most relevant motion cluster. If the region of interest A is assigned the maximum weight and is then the only region of interest, only the motion clusters overlapping the region of interest A will be considered. In this case, the motion cluster X is the only motion cluster that overlaps the region of interest A, and the exposure time is adjusted based on motion information, for example, the magnitude of the motion of the motion cluster X.

Figure 9:
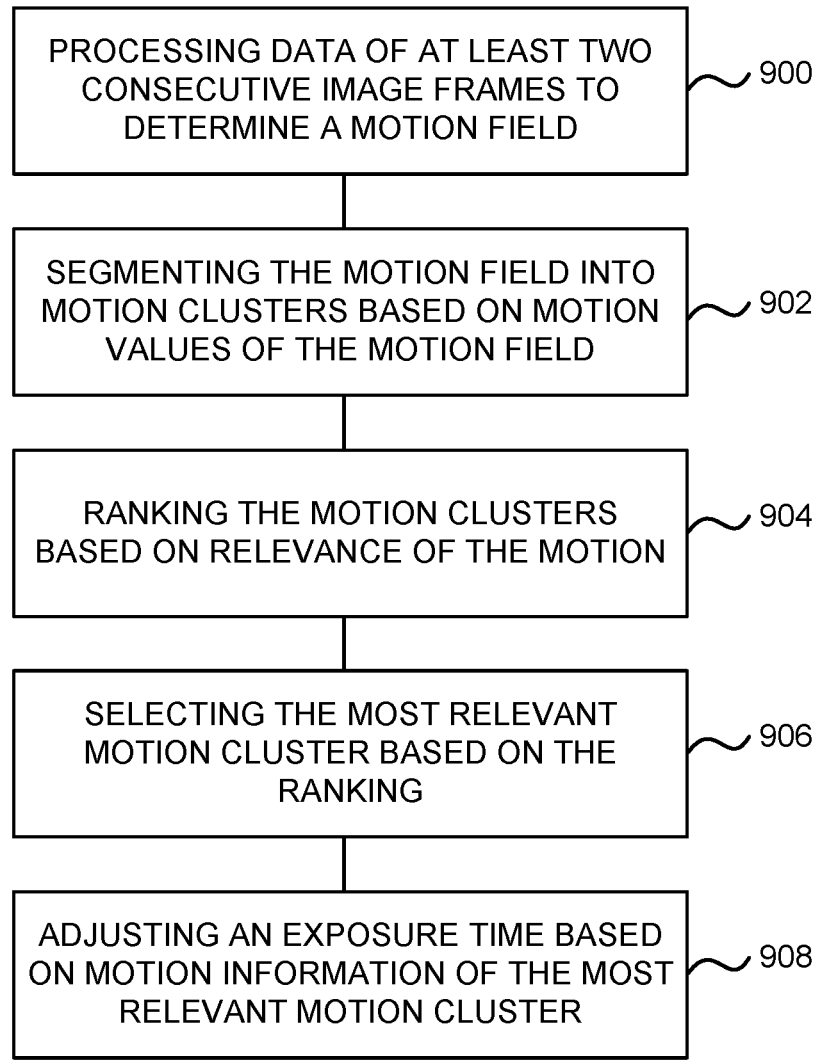
FIG. 9 is a flowchart illustrating one embodiment of a method for determining an exposure time for an image frame.

FIG. 9 is a flowchart illustrating one embodiment of a method for determining an exposure time for an image frame, when a digital image is to be captured. When a user operates a digital camera or an apparatus comprising a digital camera, the user may use automatic exposure settings, and the digital camera decides various shooting parameters (for example, the exposure time, the aperture and the ISO value). Another possibility is to manually set at least one of these shooting parameters. In the following, a method for determining the exposure time for an image frame is provided.

At 900 at least two consecutive image frames are processed to determine a motion field. When a user intends to take digital images with an apparatus, the images frames may be automatically recorded in an image frame buffer even if the user does not press the shutter-release button. The apparatus is then able to perform some analysis based on the image frames stored in the image frame buffer. An image frame may refer to a normal size image frame comprising all captured image pixels or to a smaller size image frame including a subset of all captured image pixels shown, for example, in a view-finder of the apparatus. The motion field defines the motion of an image point or a set of image points. The motion field may be represented as a function which maps image coordinates to a two-dimensional vector.

At 902 the motion field is segmented into motion clusters based on motion values of the motion field. Each motion cluster represents moving or non-moving objects or regions in the image frames. Motion values of a particular motion cluster are identical or substantially identical having the same direction and magnitude.

At 904 the motion clusters are ranked based on relevance of the motion. One or more of the following parameters may have an effect on the relevance of the motion: the size of the motion cluster, the location of the motion cluster, the frequency of occurrence of the motion cluster in the image frames, the direction of motion in the motion cluster, and the motion propagation across the at least two consecutive image frames. Each of these parameters may have a different weight when the relevance of motion of the motion clusters is to be determined.

At 906 the most relevant motion cluster is selected based on the ranking, and at 908 the exposure time is adjusted based on motion information of the most relevant motion cluster. Since multiple image frames are processed, it is possible to calculate the speed of movement in the most relevant motion cluster, and to determine the required exposure time based on this.

By taking into account only the motion of the most relevant motion cluster in determining the exposure time, it is possible to set the exposure time to a level that avoids motion blur in the most relevant part of an image frame.

An embodiment of an apparatus comprises an apparatus comprising at least one processing unit and at least one memory. The at least one memory stores program instructions that, when executed by the at least one processing unit, cause the apparatus to process at least one image frame, select at least one region of interest from the at least one image frame, process at least two consecutive image frames to determine a motion field, segment the motion field into at least one motion cluster, select, based on the at least one region of interest and the at least one motion cluster, the most relevant motion cluster, and adjust the exposure time based on motion information of the selected most relevant motion cluster.

In one embodiment, the at least one memory stores program instructions that, when executed by the at least one processing unit, cause the apparatus to process the at least two consecutive image frames to determine the motion field only within the at least one region of interest.

In one embodiment, alternatively or in addition, the at least one memory stores program instructions that, when executed by the at least one processing unit, cause the apparatus to determine at least one salient region from the at least one image frame, and select the at least one salient region as the at least one region of interest.

In one embodiment, alternatively or in addition, the at least one memory stores program instructions that, when executed by the at least one processing unit, cause the apparatus to determine at least two salient regions of interest from the at least one image frame, and select the salient region closest to the center of the at least one image frame as the region of interest.

In one embodiment, alternatively or in addition, the at least one memory stores program instructions that, when executed by the at least one processing unit, cause the apparatus to process the at least one region of interest to determine a saliency map, weight the motion field with values of the saliency map, and select the motion cluster having the highest weight as the most relevant motion cluster.

In one embodiment, alternatively or in addition, the at least one memory stores program instructions that, when executed by the at least one processing unit, cause the apparatus to determine a weight for each region of interest.

In one embodiment, alternatively or in addition, the weight of a region of interest is based on at least one of the following: the size of the region of interest, and the location of the region of interest.

In one embodiment, alternatively or in addition, the at least one memory stores program instructions that, when executed by the at least one processing unit, cause the apparatus to determine a weight for each motion cluster.

In one embodiment, alternatively or in addition, the weight of a motion cluster is based on at least one of the following: the magnitude of motion in the motion cluster, the size of the motion cluster, the location of the motion cluster, the frequency of occurrence in the image frames of the motion cluster, the direction of motion in the motion cluster, and the motion propagation across the at least two consecutive image frames.

In one embodiment, alternatively or in addition, the at least one memory stores program instructions that, when executed by the at least one processing unit, cause the apparatus to determine a weight for each region of interest, determine a weight for each motion cluster, modify the weight of a motion cluster depending on the weight of a region of interest overlapping the motion cluster, and select the motion cluster having the highest modified weight as the most relevant motion cluster.

In one embodiment, alternatively or in addition, the at least one memory stores program instructions that, when executed by the at least one processing unit, cause the apparatus to identify at least one face in the at least one image frame, and select at least one region comprising the at least one face as the at least one region of interest.

In one embodiment, alternatively or in addition, the at least one memory stores program instructions that, when executed by the at least one processing unit, cause the apparatus to select the region of interest in response to an indication from a user.

In one embodiment, alternatively or in addition, the at least one memory stores program instructions that, when executed by the at least one processing unit, cause the apparatus to predefine at least one region, each region having a weight, and select the at least one region as the at least one region of interest.

In one embodiment, alternatively or in addition, the at least one memory stores program instructions that, when executed by the at least one processing unit, cause the apparatus to determine that one or more motion clusters overlap with the at least one region of interest, and select the most relevant motion cluster from the one or more motion clusters overlapping with the at least one region of interest.

An embodiment of an apparatus comprises means for processing at least one image frame, means for selecting at least one region of interest from the at least one image frame, means for processing at least two consecutive image frames to determine a motion field, means for segmenting the motion field into at least one motion cluster, means for selecting, based on the at least one region of interest and the at least one motion cluster, the most relevant motion cluster, and means for adjusting the exposure time based on motion information of the selected most relevant motion cluster.

An embodiment of a method comprises processing at least one image frame, selecting at least one region of interest from the at least one image frame, processing at least two consecutive image frames to determine a motion field, segmenting the motion field into at least one motion cluster, selecting, based on the at least one region of interest and the at least one motion cluster, the most relevant motion cluster, and adjusting the exposure time based on motion information of the selected most relevant motion cluster.

In one embodiment, the method comprises processing the at least two consecutive image frames to determine the motion field only within the at least one region of interest.

In one embodiment, alternatively or in addition, the method comprises determining at least one salient region from the at least one image frame, and selecting the at least one salient region as the at least one region of interest.

In one embodiment, alternatively or in addition, the method comprises determining at least two salient regions of interest from the at least one image frame, and selecting the salient region closest to the center of the at least one image frame as the region of interest.

In one embodiment, alternatively or in addition, the method comprises processing the at least one region of interest to determine a saliency map, weighting the motion field with values of the saliency map, and selecting the motion cluster having the highest weight as the most relevant motion cluster.

In one embodiment, alternatively or in addition, the method comprises determining a weight for each region of interest.

In one embodiment, alternatively or in addition, the weight of a region of interest is based on at least one of the following: the size of the region of interest, and the location of the region of interest.

In one embodiment, alternatively or in addition, the method comprises determining a weight for each motion cluster.

In one embodiment, alternatively or in addition, the weight of a motion cluster is based on at least one of the following: the magnitude of motion in the motion cluster, the size of the motion cluster, the location of the motion cluster, the frequency of occurrence in the image frames of the motion cluster, the direction of motion in the motion cluster, and the motion propagation across the at least two consecutive image frames.

In one embodiment, alternatively or in addition, the method comprises determining a weight for each region of interest, determining a weight for each motion cluster, modifying the weight of a motion cluster depending on the weight of a region of interest overlapping the motion cluster, and selecting the motion cluster having the highest modified weight as the most relevant motion cluster.

In one embodiment, alternatively or in addition, the method comprises identifying at least one face in the at least one image frame, and selecting at least one region comprising the at least one face as the at least one region of interest.

In one embodiment, alternatively or in addition, the method comprises selecting the region of interest in response to an indication from a user.

In one embodiment, alternatively or in addition, the method comprises predefining at least one region, each region having a weight, and selecting the at least one region as the at least one region of interest.

In one embodiment, alternatively or in addition, the method comprises determining that one or more motion clusters overlap with the at least one region of interest, and selecting the most relevant motion cluster from the one or more motion clusters overlapping with the at least one region of interest.

An embodiment of a computer program comprises executable instructions for causing at least one processor of a computing apparatus to perform operations comprising: processing at least one image frame, selecting at least one region of interest from the at least one image frame, processing at least two consecutive image frames to determine a motion field, segmenting the motion field into at least one motion cluster, selecting, based on the at least one region of interest and the at least one motion cluster, the most relevant motion cluster, and adjusting the exposure time based on motion information of the selected most relevant motion cluster.

An embodiment of a computer-readable storage medium comprises executable instructions for causing at least one processor of a computing apparatus to perform operations comprising: processing at least one image frame, selecting at least one region of interest from the at least one image frame, processing at least two consecutive image frames to determine a motion field, segmenting the motion field into at least one motion cluster, selecting, based on the at least one region of interest and the at least one motion cluster, the most relevant motion cluster, and adjusting the exposure time based on motion information of the selected most relevant motion cluster.

An embodiment of an apparatus comprises an apparatus comprising at least one processing unit and at least one memory. The at least one memory stores program instructions that, when executed by the at least one processing unit, cause the apparatus to process at least two consecutive image frames to determine a motion field, segment the motion field into different motion clusters based on motion values in the motion field, rank the motion clusters based on relevance of the motion, select the most relevant motion cluster based on the ranking, and adjust the exposure time based on motion information of the most relevant motion cluster.

An embodiment of an apparatus comprises means for processing at least two consecutive image frames to determine a motion field, means for segmenting the motion field into different motion clusters based on motion values in the motion field, means for ranking the motion clusters based on relevance of the motion, means for selecting the most relevant motion cluster based on the ranking, and means for adjusting the exposure time based on motion information of the most relevant motion cluster.

An embodiment of a method comprises processing at least two consecutive image frames to determine a motion field, segmenting the motion field into different motion clusters based on motion values in the motion field, ranking the motion clusters based on relevance of the motion, selecting the most relevant motion cluster based on the ranking, and adjusting the exposure time based on motion information of the most relevant motion cluster.

An embodiment of a computer program comprises executable instructions for causing at least one processor of a computing apparatus to perform operations comprising: processing at least two consecutive image frames to determine a motion field, segmenting the motion field into different motion clusters based on motion values in the motion field, ranking the motion clusters based on relevance of the motion, selecting the most relevant motion cluster based on the ranking, and adjusting the exposure time based on motion information of the most relevant motion cluster.

An embodiment of a computer-readable storage medium comprises executable instructions for causing at least one processor of a computing apparatus to perform operations comprising: processing at least two consecutive image frames to determine a motion field, segmenting the motion field into different motion clusters based on motion values in the motion field, ranking the motion clusters based on relevance of the motion, selecting the most relevant motion cluster based on the ranking, and adjusting the exposure time based on motion information of the most relevant motion cluster.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements. It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

What is claimed is:

1. An apparatus, comprising:
   at least one processing unit;
   at least one memory, wherein the at least one memory stores program instructions that, when executed by the at least one processing unit, cause the apparatus to:
   process at least one image frame;
   select at least one region of interest from the at least one image frame;
   process the at least one image frame and a second image frame to determine a motion field;
   determine that the region of interest is not in the motion field;
   based on determining that the region of interest is not in the motion filed, adjust an exposure time based on the region of interest.

2. An apparatus according to claim 1, wherein the at least one memory stores program instructions that, when executed by the at least one processing unit, cause the apparatus to:
   process the at least two consecutive image frames to determine the motion field.

3. An apparatus according to claim 1, wherein the at least one memory stores program instructions that, when executed by the at least one processing unit, cause the apparatus to:
determine at least one salient region from the at least one image frame, the salient region comprising at least a portion of a salient object; and
select the at least one salient region as the at least one region of interest.

4. An apparatus according to claim 1, wherein the at least one memory stores program instructions that, when executed by the at least one processing unit, when selecting the region of interest, cause the apparatus to:
determine at least two salient regions of interest from the at least one image frame; and
select a salient region closest to a center of the at least one image frame and the salient object as the region of interest.

5. An apparatus according to claim 1, wherein the at least one memory stores program instructions that, when executed by the at least one processing unit, when selecting the region of interest, cause the apparatus to:
determine a weight for each region of interest.

6. An apparatus according to claim 5, wherein the weight of a region of interest is based on at least one of the following:
a size of the region of interest; and
a location of the region of interest.

7. An apparatus according to claim 1, wherein the at least one memory stores program instructions that, when executed by the at least one processing unit, cause the apparatus to:
identify at least one face in the at least two image frames, the at least one face being the salient object; and
select at least one region comprising the at least one face as the at least one region of interest.

8. An apparatus according to claim 1, wherein selecting the region of interest is further based on an indication from a user to select the region of interest.

9. An apparatus according to claim 1, wherein the at least one memory stores program instructions that, when executed by the at least one processing unit, cause the apparatus to:
adjust the at least one region of interest based on a size of the salient object.

10. A method comprising:
processing at least one image frame;
selecting at least one region of interest from the at least one image frame;
processing the at least one image frame and a second image frame to determine a motion field;
determining that the region of interest is not in the motion field;
based on determining that the region of interest is not in the motion filed, adjusting an exposure time based on the region of interest.

11. A method according to claim 10, further comprising processing the at least two consecutive image frames to determine the motion field.

12. A method according to claim 10, further comprising:
determining at least one salient region from the at least one image frame, the salient region comprising at least a portion of a salient object; and
selecting the at least one salient region as the at least one region of interest.

13. A method according to claim 10, further comprising:
determining at least two salient regions of interest from the at least one image frame; and
selecting a salient region closest to a center of the at least one image frame and the salient object as the region of interest.

14. A method according to claim 10, further comprising:
identifying at least one face in the at least one image frame; and
selecting at least one region comprising the at least one face as the at least one region of interest.

15. A method according to claim 10, further comprising adjusting the at least one region of interest based on a size of the salient object.

16. One or more computer-readable storage devices having computer-executable instructions that, when executed by one or more processors, cause the one or more processors to perform operations comprising:
processing at least one image frame;
selecting at least one region of interest from the at least one image frame;
processing the at least one image frame and a second image frame to determine a motion field;
determining that the region of interest is not in the motion field;
based on determining that the region of interest is not in the motion filed, adjusting an exposure time based on the region of interest.

17. The one or more computer-readable storage devices of claim 16, wherein the computer-executable instructions further cause the one or more processors to perform operations comprising processing the at least two consecutive image frames to determine the motion field.

18. The one or more computer-readable storage devices of claim 16, wherein the computer-executable instructions further cause the one or more processors to perform operations comprising:
determining at least one salient region from the at least one image frame, the salient region comprising at least a portion of a salient object; and
selecting the at least one salient region as the at least one region of interest.

19. The one or more computer-readable storage devices of claim 16, wherein the computer-executable instructions further cause the one or more processors to perform operations comprising:
determining at least two salient regions of interest from the at least one image frame; and
selecting a salient region closest to a center of the at least one image frame and the salient object as the region of interest.

20. The one or more computer-readable storage devices of claim 16, wherein the computer-executable instructions further cause the one or more processors to perform operations comprising:
identifying at least one face in the at least one image frame; and
selecting at least one region comprising the at least one face as the at least one region of interest.

* * * * *